(12) United States Patent
Yoon et al.

(10) Patent No.: US 9,903,990 B2
(45) Date of Patent: *Feb. 27, 2018

(54) PRESSURE-SENSITIVE ADHESIVE

(71) Applicant: LG CHEM, LTD., Seoul (KR)

(72) Inventors: Sung Soo Yoon, Daejeon (KR); No Ma Kim, Daejeon (KR); In Ho Hwang, Daejeon (KR); In Kyu Park, Daejeon (KR); Min Joon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 471 days.

This patent is subject to a terminal disclaimer.

(21) Appl. No.: 14/189,512

(22) Filed: Feb. 25, 2014

(65) Prior Publication Data

US 2014/0178608 A1    Jun. 26, 2014

Related U.S. Application Data

(63) Continuation of application No. PCT/KR2012/006842, filed on Aug. 27, 2012.

(30) Foreign Application Priority Data

Aug. 25, 2011  (KR) .......................... 10-2011-0085193
Aug. 27, 2012  (KR) .......................... 10-2012-0093828

(51) Int. Cl.
| | | |
|---|---|---|
| C09J 133/14 | (2006.01) | |
| G02B 5/30 | (2006.01) | |
| C09J 133/08 | (2006.01) | |
| G02F 1/13 | (2006.01) | |
| C09J 7/00 | (2018.01) | |
| G02B 1/10 | (2015.01) | |
| G02F 1/1335 | (2006.01) | |

(52) U.S. Cl.
CPC .............. *G02B 5/3025* (2013.01); *C09J 7/00* (2013.01); *C09J 133/08* (2013.01); *C09J 133/14* (2013.01);
(Continued)

(58) Field of Classification Search
CPC . C09J 7/00; C09J 133/08; C09J 133/14; C09J 2201/622; C09J 2203/318;
(Continued)

(56) References Cited

U.S. PATENT DOCUMENTS

2006/0099411 A1    5/2006  Xia et al.
2006/0162857 A1*   7/2006  Nagamoto .............. C09J 133/08
                                                156/272.8
(Continued)

FOREIGN PATENT DOCUMENTS

CN    103003379 A     3/2013
EP    2527885 A2     11/2012
(Continued)

OTHER PUBLICATIONS

Dictionary.com, "Room temperature," Jun. 1, 2016.*

*Primary Examiner* — Eli D. Strah
(74) *Attorney, Agent, or Firm* — Dentons US LLP

(57) ABSTRACT

Provided are a pressure-sensitive adhesive, a polarizing plate, and a liquid crystal display device. The pressure-sensitive adhesive may be used to provide a polarizing plate which has a tensile modulus that varies in a thickness direction, and for example, which has a smaller thickness and a lighter weight, and also satisfies all of the physical properties required for the polarizing plate such as durability, water resistance, workability and light leakage preventability, and a liquid crystal display device including the same.

11 Claims, 2 Drawing Sheets

(52) U.S. Cl.
CPC .............. *G02B 1/10* (2013.01); *G02F 1/13*
(2013.01); *G02F 1/133528* (2013.01); *B32B
2457/202* (2013.01); *C09J 2201/622*
(2013.01); *C09J 2203/318* (2013.01); *C09J
2433/00* (2013.01); *G02F 2202/28* (2013.01);
*Y10T 428/105* (2015.01); *Y10T 428/1041*
(2015.01); *Y10T 428/1077* (2015.01); *Y10T
428/1082* (2015.01); *Y10T 428/2848*
(2015.01); *Y10T 428/2891* (2015.01)

(58) Field of Classification Search
CPC ...... C09J 2433/00; G02B 5/3025; G02B 1/10;
G02F 1/13; G02F 1/133528; G02F
2202/28; Y10T 428/1041; Y10T 428/105;
Y10T 428/1077; Y10T 428/2891; Y10T
428/2848; Y10T 428/1082; B32B
2457/202
See application file for complete search history.

(56) References Cited

U.S. PATENT DOCUMENTS

| 2008/0220251 | A1* | 9/2008 | Takaki | A61L 15/58 |
| | | | | 428/345 |
| 2010/0178496 | A1* | 7/2010 | Masuda | C09J 7/00 |
| | | | | 428/347 |
| 2011/0007244 | A1* | 1/2011 | Kim | C08G 18/6229 |
| | | | | 349/96 |
| 2012/0320317 | A1* | 12/2012 | Yoon | G02B 5/305 |
| | | | | 349/96 |
| 2012/0328800 | A1* | 12/2012 | Yoon | C09J 7/00 |
| | | | | 428/1.55 |

FOREIGN PATENT DOCUMENTS

| JP | 07-041736 | | 2/1995 | |
| JP | 2002-014226 A | | 1/2002 | |
| JP | 2006-299019 | | 11/2006 | |
| JP | 2007-212995 | | 8/2007 | |
| JP | 2009205141 A | * | 9/2009 | .............. G02B 5/30 |
| JP | 2011-511100 A | | 4/2011 | |
| KR | 10-2010-0008773 | | 1/2010 | |
| KR | 10-2011-0005114 | | 1/2011 | |
| KR | 10-2011-0098692 | | 9/2011 | |
| TW | 200942592 A1 | | 10/2009 | |
| TW | 201141974 A1 | | 12/2011 | |
| WO | 2010089203 A1 | | 8/2010 | |
| WO | WO 2011105878 A2 | * | 9/2011 | ............... C09J 7/00 |

* cited by examiner

PRESSURE-SENSITIVE ADHESIVE

This application is a Continuation Bypass Application of International Patent Application No. PCT/KR2012/006842, filed on Aug. 27, 2012, and claims the benefit of Korean Patent Application Nos. 10-2011-0085193, filed on Aug. 25, 2011 and 10-2012-0093828, filed on Aug. 27, 2012, in the Korean Intellectual Property Office, all of which are incorporated herein by reference in its entirety.

1. Field

The present application relates to a pressure-sensitive adhesive, a polarizing plate and a liquid crystal display device.

2. Background

A liquid crystal display (LCD) device is applied in various fields because it has low power consumption and can be formed in a thin plane.

An LCD device includes a liquid crystal panel including a liquid crystal present between transparent substrates and polarizing plates attached to both surfaces of the liquid crystal panel.

The polarizing plate includes a polarizer having a polarizing function. Since the polarizer is conventionally formed of a hydrophilic resin such as polyvinylalcohol, it is generally vulnerable to moisture. In addition, since the polarizer is formed through an extension process, it contracts easily under humid conditions, and thus has poor optical characteristics. For this reason, to compensate for physical properties of the polarizer, in a structure of a conventional polarizing plate, protective films represented as triacetyl cellulose (TAC) films are generally attached to both surfaces of the polarizer.

In such a structure of the conventional polarizing plate, to provide a device having a smaller thickness and light weight, for example, as described in Japanese Patent Laid-Open Publication No. 2002-014226, there have been attempts to form the polarizing plate while omitting one of the protective films formed on both surfaces of the conventional polarizer. However, it is difficult to provide a polarizing plate having desired performance without using a protective film.

SUMMARY

The present application provides a pressure-sensitive adhesive, a polarizing plate and an LCD device.

One illustrative pressure-sensitive adhesive may be in the shape of a film. The pressure-sensitive adhesive in the shape of the film may be a single layer. The term "single layer" as used herein may refer to a state where the pressure-sensitive adhesive is formed to be one layer. Therefore, a pressure-sensitive adhesive formed in a structure in which at least two layers are stacked is excluded from the pressure-sensitive adhesive that is the single layer. The pressure-sensitive adhesive in the shape of the film may have a main surface (hereinafter referred to as a "first surface") and a surface (hereinafter referred to as a "second surface") at an opposite side thereof. FIG. 1 shows a schematic of one illustrative embodiment of the pressure-sensitive adhesive 101 viewed from a side, in which the first surface 1011 and the second surface 1012 are shown.

In one embodiment, an elastic modulus of the pressure-sensitive adhesive may vary along a thickness direction. In this document, the pressure-sensitive adhesive, of which the elastic modulus varies along the thickness direction may be referred to as a pressure-sensitive adhesive, in which a gradient of the elastic modulus is formed along the thickness direction. The term "thickness direction" of the pressure-sensitive adhesive as used herein may refer to a direction parallel to a normal line direction of the surface of the pressure-sensitive adhesive in the shape of the film. The gradient of the elastic modulus in the thickness direction may refer to a state where, from one surface of the pressure-sensitive adhesive to an opposite surface thereof, the elastic modulus continuously or discontinuously increases or decreases, or the elastic modulus varies with repeating increase and the decrease along the thickness direction. For example, the elastic modulus of the pressure-sensitive adhesive may increase or decrease along the thickness direction such that one of the both surfaces, for example, the first surface has the highest elastic modulus, and the other surface, for example, the second surface has the lowest elastic modulus.

The term "elastic modulus" as used herein may refer to a storage or tensile modulus, and unless specifically defined otherwise, may refer to a tensile modulus at the room temperature. The term "room temperature" as used herein may refer to a range from 10° C. to 40° C., 20° C. to 30° C., or at approximately 20° C., 23° C., 25° C. or 30° C., that is neither increased nor decreased.

The pressure-sensitive adhesive may have an elastic modulus in a range from approximately 0.01 GPa to 1 GPa. For example, the elastic modulus of the pressure-sensitive adhesive may be 0.015 GPa or more, 0.02 GPa or more, 0.03 GPa or more, 0.045 GPa or more, 0.06 GPa or more or 0.065 GPa or more within the above range. In addition, the elastic modulus of the pressure-sensitive adhesive may be 0.7 GPa or less, 0.5 GPa or less, 0.4 GPa or less, 0.3 GPa or less, 0.25 GPa or less, 0.2 GPa or less, 0.15 GPa or less or 0.1 GPa or less within the above range. In such a range of the elastic modulus, light leakage of the polarizing plate may be effectively prevented, and excellent durability of the polarizing plate may be ensured in an LCD device. For example, in case where the elastic modulus of the pressure-sensitive adhesive varies along the thickness direction as described above, the elastic modulus as described above may be an elastic modulus measured with respect to the entire pressure-sensitive adhesive, that is, an average elastic modulus.

The pressure-sensitive adhesive may have different peel strengths on both surfaces, for example, the first and second surfaces as described above. For example, referring to FIG. 1, the peel strength of the first surface 1011 with respect to alkali-free glass may be different from that of the second surface 1012, and for example the peel strength of the first surface 1011 with respect to alkali-free glass may be lower than that of the second surface 1012. The peel strength may be a peel strength with respect to alkali-free glass, which is measured at a peel rate of 300 mm/min and a peel angle of 180 degrees at room temperature.

For example, of the both surfaces of the pressure-sensitive adhesive, the surface, of which the peel strength is higher than that of the other, may have the peel strength with respect to alkali-free glass in a range from 100 to 2,500 gf/25 mm at the room temperature. The peel strength may be, for example, 150 gf/25 mm or more, 200 gf/25 mm or more, 250 gf/25 mm or more or 300 gf/25 mm or more within the above range. The peel strength may also be 2,000 gf/25 mm or less, 1,700 gf/25 mm or less, 1,500 gf/25 mm or less, 1,000 gf/25 mm or less, 800 gf/25 mm or less, 750 gf/25 mm or less or 700 gf/25 mm or less within the above range. In such a range, the polarizing plate may have excellent durability in the LCD device.

Hereinafter, in this document, the surface of the both surfaces of the pressure-sensitive adhesive, of which the peel strength is higher than that of the other, may be referred to as a second surface, and the surface, of which the peel strength is lower than that of the other, may be referred to as a first surface for the convenience of description.

In the pressure-sensitive adhesive, a difference (P2−P1) between the peel strength (P2) with respect to a glass of the second surface at the room temperature and the peel strength (P1) with respect to a glass of the first surface at the room temperature may be 100 gf/25 mm or more, 200 gf/25 mm or more, 300 gf/25 mm or more, 400 gf/25 mm or more, 500 gf/25 mm or more, 600 gf/25 mm or more, 630 gf/25 mm or more, 650 gf/25 mm or more or 700 gf/25 mm or more. The difference (P2−P1) may be, but is not particularly limited to, for example, 2,000 gf/25 mm or less, 1,500 gf/25 mm or less or 1,000 gf/25 mm or less. When the difference in peel strength between the first and second surfaces is within the above range, the pressure-sensitive adhesive may be used for suitable as will be described below.

In another embodiment, a ratio (P2/P1) of the peel strength (P2) with respect to a glass of the second surface at the room temperature and the peel strength (P1) with respect to a glass of the first surface at the room temperature may be, for example, 5 or more, 10 or more, 15 or more, 20 or more, 25 or more or 30 or more. The ratio (P2/P1) may be, but is not particularly limited to, for example, 500 or less, 400 or less, 300 or less, 200 or less, 100 or less or 50 or less. When the ratio of the peel strengths between the first and second surfaces is within the above range, the pressure-sensitive adhesive may be used for suitable as will be described below.

The peel strength of the surface (the first surface) of the pressure-sensitive adhesive, of which the peel strength is lower than the other, may be, but is not particularly limited to, for example, in a range from approximately 5 to 100 gf/25 mm with respect to the alkali-free glass at the room temperature. The peel strength may be 10 gf/25 mm or more, or 70 gf/25 mm or less, 50 gf/25 mm or less or 40 gf/25 mm or less within the above range.

For example, in the pressure-sensitive adhesive, a value (M×P)(unit: GPa·gf/25 mm) obtained by multiplying the average tensile elastic modulus (M)(unit: GPa) by the peel strength of the second surface with respect to the glass at the room temperature may be 20 or more.

The value (M×P)(unit: GPa·gf/25 mm) obtained by multiplying the average tensile elastic modulus (M)(unit: GPa) by the peel strength may be, for example, more than 20, 30 or more, 40 or more, 50 or more, 60 or more, 70 or more, 75 or more, 80 or more, 90 or more or 100 or more. The value (M×P)(unit: GPa·gf/25 mm) obtained by multiplying the average tensile elastic modulus (M)(unit: GPa) by the peel strength may be, for example, 2,000 or less, 1,500 or less, 1,000 or less, 900 or less, 650 or less, 500 or less, 400 or less, 300 or less, 200 or less or 100 or less. In such a range, the pressure-sensitive adhesive may be applied in the following use, and thus have appropriate characteristics.

To prepare the above pressure-sensitive adhesive, for example, methods, in which recipes of a PSA composition is controlled during preparation process of the PSA as described below, or in which a thickness of a layer of the PSA composition or the intensity and/or luminance of the active energy beam is controlled during irradiating with the active energy beam, may be used.

The pressure-sensitive adhesive may include an interpenetrating polymer network (hereinafter, referred to as an "IPN"). The term "IPN" as used herein may refer to a state where the PSA includes at least two crosslinking structures. For example, the at least two crosslinking structures in the IPN may be entangled, physically or chemically linked or penetrated with each other.

The IPN may include, for example, a first crosslinking structure including an acrylic polymer crosslinked by a multifunctional crosslinking agent and a second crosslinking structure including a polymerized active energy beam-polymerizable compound. For example, the first crosslinking structure is a crosslinking structure formed by heat, and the second crosslinking structure may be a crosslinking structure formed by radiation of active energy beams. The term "active energy beam" as used herein may refer to electromagnetic wave including microwaves, infrared (IR) rays, ultraviolet (UV) rays, X rays, γ rays, or particle beams such as α particle beams, proton beams, neutron beams and electron beams, and conventionally UV rays or electron beams may be included.

The pressure-sensitive adhesive may be, for example, a layer of the pressure-sensitive adhesive composition. The term "layer of the pressure-sensitive adhesive or adhesive composition" as used herein may refer to a layer formed by coating or curing the pressure-sensitive adhesive composition or adhesive composition. The term "curing of the pressure-sensitive adhesive or adhesive composition" as used herein may refer to realizing the crosslinking structure in the pressure-sensitive adhesive or adhesive composition by inducing a physical or chemical interaction or reaction between components in the pressure-sensitive adhesive or adhesive composition. For example, the curing may be induced by maintaining the composition at the room temperature, providing the composition with moisture or heat, irradiating the composition with the active energy beam or performing at least two processes thereof. Pressure-sensitive adhesives or adhesive compositions which are cured according to the respective processes may be referred to as a room temperature curable pressure-sensitive adhesive composition or adhesive composition, a moisture-curable pressure-sensitive adhesive composition or adhesive composition, a thermal curable pressure-sensitive adhesive composition or adhesive composition, an active energy beam-curable pressure-sensitive adhesive composition or adhesive composition, and a hybrid-curable pressure-sensitive adhesive or adhesive composition.

The pressure-sensitive adhesive composition may include an acrylic polymer. The acrylic polymer may use, for example, a polymer having a weight average molecular weight (Mw) of 400,000 or more. The term "weight average molecular weight" as used herein may refer to a conversion value with respect to the reference polystyrene measured by gel permeation chromatography (GPC), and unless specifically defined otherwise, the term "molecular weight" may refer to the "weight average molecular weight." When the molecular weight of the polymer is 400,000 or more, the durability of the pressure-sensitive adhesive may be maintained in a suitable range. The upper limit of the molecular weight is not particularly limited, and thus may be controlled in a range of approximately 2,500,000 or less, for example, in consideration of coatability.

The acrylic polymer may include, for example, a polymerized unit derived from a (meth)acrylic acid ester compound.

As the (meth)acrylic acid ester compound, alkyl (meth)acrylate may be used. In consideration of cohesion strength, a glass transition temperature and a pressure-sensitive adhesive property, for example, an alkyl (meth)acrylate containing an alkyl group having 1 to 14 carbon atoms may be used. Such a monomer may be methyl (meth)acrylate, ethyl (meth)acrylate, n-propyl (meth)acrylate, isopropyl (meth) acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth) acrylate, isooctyl (meth)acrylate, isononyl (meth)acrylate, lauryl (meth)acrylate or tetradecyl (meth)acrylate.

As a (meth)acrylic acid ester compound, compounds other than the alkyl (meth)acrylate may be used.

For example, as the compound, a compound represented by Formula 1 may be used.

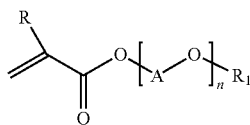

[Formula 1]

In Formula 1, R is hydrogen or an alkyl group, A is an alkylene group or an alkylidene group, $R_1$ is an alkyl group or an aryl group, and n is a number between 1 and 50.

A polymerized unit derived from the compound of Formula 1 may provide an alkyleneoxide chain to the polymer. In one embodiment, the alkyleneoxide chain may be a linear, branched or cyclic alkyleneoxide chain having 1 to 20, 1 to 16, 1 to 12, 1 to 8 or 1 to 4 carbon atoms. The alkyleneoxide chain may provide effects of maintaining a low haze of the pressure-sensitive adhesive and inhibiting light leakage. The alkyleneoxide chain may allow the peel strength of the pressure-sensitive adhesive to maintain a suitable level even when the elastic modulus thereof is considerably increased.

In Formula 1, the "R" may be, for example, hydrogen or an alkyl group having 1 to 4 carbon atoms, or hydrogen or a methyl group.

In Formula 1, the "A" may be an unsubstituted or substituted alkylene or alkylidene group having 1 to 20, 1 to 16, 1 to 12, 1 to 8 or 1 to 4 carbon atoms. The alkylene or alkylidene group may have a linear, branched or cyclic structure.

In Formula 1, when the "$R_1$" is an alkyl group, the alkyl group may be an unsubstituted or substituted alkyl group having 1 to 20, 1 to 16, 1 to 12, 1 to 8 or 1 to 4 carbon atoms. The alkyl group may have a linear, branched or cyclic structure.

In Formula 1, when the "$R_1$" is an aryl group, the aryl group may be an aryl group having 6 to 20, 6 to 16 or 6 to 12 carbon atoms.

In Formula 1, the "n" may be a number between 1 and 25, 1 and 15 or 1 and 6.

The compound of Formula 1 may be an alkoxy alkyleneglycol (meth)acrylic acid ester, an alkoxy dialkyleneglycol (meth)acrylic acid ester, an alkoxy trialkyleneglycol (meth)acrylic acid ester, an alkoxy tetraalkyleneglycol (meth)acrylic acid ester, an alkoxy polyethyleneglycol (meth)acrylic acid ester, a phenoxy alkyleneglycol (meth) acrylic acid ester, a phenoxy dialkyleneglycol (meth)acrylic acid ester, a phenoxy trialkyleneglycol (meth)acrylic acid ester, a phenoxy tetraalkyleneglycol (meth)acrylic acid ester or a phenoxy polyalkyleneglycol (meth)acrylic acid ester.

The acrylic polymer may further include a polymerized unit derived from a copolymerizable monomer having a polar group. Here, the copolymerizable monomer having a polar functional group may be a monomer which can be copolymerized with another compound forming the acryl polymer such as a (meth)acrylic acid ester compound, and provide a polar functional group to a side chain or terminal end of the polymer after the copolymerization. The polar functional group may be a functional group, for example, which may realize the crosslinking structure by reaction with a multifunctional crosslinking agent to be described later by supply of heat, or may serve to improve wettability of the pressure-sensitive adhesive with respect to an adhesive layer or liquid crystal panel. For example, the polar functional group may be a hydroxyl group, a carboxyl group or an anhydride group thereof, an acid group of a sulfonic acid group or a phosphoric acid group, a glycidyl group, an amino group or an isocyanate group.

The copolymerizable monomer having a polar group may be, for example, a copolymerizable monomer having a hydroxyl group. The copolymerizable monomer having a hydroxyl group may be a monomer simultaneously including a site capable of being copolymerized with another monomer forming the polymer and a hydroxyl group, thereby providing the hydroxyl group to the acrylic polymer after polymerization. Such a monomer may be, but is not limited to, a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth) acrylate or 8-hydroxyoctyl (meth)acrylate, or a hydroxyalkyleneglycol (meth)acrylate such as 2-hydroxyethyleneglycol (meth)acrylate or 2-hydroxypropyleneglycol (meth)acrylate.

In another embodiment, the copolymerizable monomer having a polar group may be a copolymerizable monomer having an acid group. Such a monomer may be a monomer simultaneously including a site capable of being copolymerized with another monomer forming the acrylic polymer and an acid group, thereby providing the acid group to the acrylic polymer after polymerization. For example, the acid group may be, but is not limited to, a carboxyl group, a sulfonic acid group or a phosphoric acid group. For example, the copolymerizable monomer having an acid group may be, but is not limited to, a carboxyl group-containing compound or an anhydride thereof such as (meth) acrylic acid, 2-(meth)acryloyloxy acetic acid, 3-(meth)acryloyloxy propanoic acid, 4-(meth)acryloyloxy butyric acid, acrylic acid dimer, itaconic acid, maleic acid or maleic acid anhydride; a sulfonic acid compound such as styrene sulfonic acid, allyl sulfonic acid, 2-(meth)acrylamide-2-methyl propane sulfonic acid, (meth)acrylamide propane sulfonic acid, sulfopropyl (meth)acrylate or (meth)acryloyloxy naphthale sulfonic acid; or a phosphoric acid compound such as 2-hydroxyethyl acryloyl phosphate.

In one embodiment, the acrylic polymer may include the polymerized unit derived from the copolymerizable monomer having the hydroxyl group along with the polymerized unit derived from the copolymerizable monomer having the acid group. In this case, the provided hydroxyl and acid groups may improve cohesive strength by enhancing wettability of the pressure-sensitive adhesive and the adhesive layer, and thus improve the adhesive strength between the polarizer and the pressure-sensitive adhesive in the polarizing plate. In addition, for example, when the polarizing plate is attached to the liquid crystal panel, the acid group may provide sufficient pressure-sensitive adhesive strength to an interface of the panel.

For example, the acrylic polymer may include polymerized units derived from 70 to 99.9 parts by weight of the (meth)acrylic acid ester compound and 0.1 to 30 parts by weight of the copolymerizable monomer having the polar group. The term "parts by weight" may mean, unless specifically defined otherwise, a ratio of weights between components.

In the case where the acrylic polymer includes the polymerized unit derived from the compound of Formula 1 along with the polymerized unit derived from the alkyl (meth) acrylate, as the (meth)acrylic acid ester compound, the polymer may include the polymerized units derived from 40 to 99.9 parts by weight of the alkyl (meth)acrylate and 10 to 50 parts by weight of the compound of Formula 1.

In addition, when the acrylic polymer includes the polymerized unit derived from the copoylmerizable monomer having the hydroxyl group and the polymerized unit derived from the copoylmerizable monomer having the acid group, the polymer may include, but is not limited to, the polymerized units derived from 0.1 to 20 parts by weight of the copoylmerizable monomer having the hydroxyl group and 0.5 to 10 parts by weight of the copoylmerizable monomer having the acid group. In such a weight ratio range, the pressure-sensitive adhesive may have suitable pressure-sensitive adhesive strength with respect to the adhesive and the liquid crystal panel, and have internal cohesive strength, durability, workability and light leakage effects, which may be controlled in a suitable range.

To control the glass transition temperature and provide other functionality, the acrylic polymer may further include a polymerized unit derived from any conventional comonomers, for example, a nitrogen-containing monomer such as (meth)acrylonitrile, (meth)acrylamide, N-methyl (meth) acrylamide, N-vinyl pyrrolidone, N-vinyl caprolactame or N-butoxy methyl (meth)acrylamide; a styrene-based monomer such as styrene or methyl styrene; glycidyl (meth) acrylate; or a carboxylic acid vinyl ester such as vinyl acetate. Such a polymerized unit may be included in an amount of, for example, 20 parts by weight or less based on another polymerized unit.

The acrylic polymer may be prepared through a known polymerization method. For example, the acrylic polymer may be prepared by applying a conventional polymerization method such as solution polymerization, photo polymerization, bulk polymerization, suspension polymerization or emulsion polymerization to a monomer mixture prepared by suitably blending a (meth)acrylic acid ester compound, a hydroxyl group-containing copolymerizable monomer, an acid group-containing copolymerizable monomer and/or other comonomers at a desired weight ratio. In the polymerization operation, when necessary, a polymerization initiator or a chain transfer agent may be also used.

The pressure-sensitive adhesive composition may further include a multifunctional crosslinking agent. For example, the crosslinking agent may realize a crosslinking structure by reaction with the polymer through the supply of heat.

The multifunctional crosslinking agent may be, but is not limited to, an isocyanate crosslinking agent, an epoxy crosslinking agent, an aziridin crosslinking agent, or a metal chelate crosslinking agent. As the isocyanate crosslinking agent, a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound prepared by reacting any one of the multifunctional isocyanate compounds with a polyol compound such as trimethylol propane may be used. As the epoxy crosslinking agent, at least one selected from the group consisting of ethyleneglycol diglycidylether, triglycidylether, trimethylolpropane triglycidylether, N,N,N',N'-tetraglycidyl ethylenediamine and glycerin diglycidylether may be used, and as the aziridine crosslinking agent, at least one selected from the group consisting of N,N'-toluene-2, 4-bis(1-aziridine carboxamide), N,N'-diphenylmethane-4,4'-bis(1-aziridine carboxamide), triethylenemelamine, bisisoprothaloyl-1-(2-methylaziridine) and tri-1-aziridinyl phosphine oxide may be used, but the present invention is not limited thereto. In addition, as the metal chelate crosslinking agent, a compound in which a polyvalent metal(s) such as aluminum, iron, zinc, tin, titanium, antimony, magnesium and/or vanadium is(are) coordinated to acetyl acetone or ethyl acetoacetate may be used, but the present invention is not limited thereto.

For example, the multifunctional crosslinking agent may be included in the pressure-sensitive adhesive composition in an amount of 0.01 to 10 parts by weight or 0.01 to 5 parts by weight with respect to 100 parts by weight of the acrylic polymer. In such a range, the pressure-sensitive adhesive may have excellent cohesive strength or durability.

The pressure-sensitive adhesive composition may further include, for example, a multifunctional active energy beam-polymerizable compound which may be polymerized by the radiation of active energy beams as a component capable of realizing the crosslinking structure different from the crosslinking structure realized by the reaction of the multifunctional crosslinking agent and the acrylic polymer. The term "multifunctional active energy beam-polymerizable compound" as used herein may refer to a compound including at least two functional groups capable of participating in the polymerization reaction through the radiation of active energy beams, for example, a functional group including an ethylenically unsaturated double bond such as an acryloyl group or a methacryloyl group or a functional group such as an epoxy group or an oxetane group.

As the multifunctional active energy beam-polymerizable compound, for example, a multifunctional acrylate (MFA) may be used.

As the multifunctional acrylate, a compound having at least two (meth)acryloyl groups in a molecule may be used without limitation. For example, the multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth)acrylate, caprolactone-modified dipentaerythritol hexa(meth)acrylate, or urethane (meth)acrylate (e.g. a reaction product of an isocyanate monomer and trimethylolpropane tri(meth)acrylate). In some cases, the multifunctional acrylate may be a photocurable oligomer known in the art, which may be any kind of urethane acrylate, polycarbonate acrylate, polyester acrylate, polyether acrylate or epoxy acrylate.

The multifunctional active energy beam-polymerizable compound may be, for example, a compound having a molecular weight of less than 1,000 and including at least three functional groups. In this case, the molecular weight may mean a weight average molecular weight or a conventional molecular weight. The multifunctional acrylate may include a ring structure in a backbone structure, and thereby the contraction or expansion of the polarizer may be more effectively inhibited, and the light leakage inhibition effect may be enhanced. The ring structure included in the multifunctional acrylate may be a carbocyclic or heterocyclic structure, or a monocyclic or polycyclic structure. The multifunctional acrylate including a ring structure may be, but is not limited to, a monomer having an isocyanurate structure such as tris(meth)acryloxy ethyl isocyanuarate or a hexafunctional acrylate such as isocyanate-modified urethane (meth)acrylate (e.g. a reaction product of an isocyanate monomer and trimethylolpropane tri(meth)acrylate).

The active energy beam-polymerizable compound may be included in the pressure-sensitive adhesive composition in an amount of 20 to 300 parts by weight relative to 100 parts by weight of the acrylic polymer.

The pressure-sensitive adhesive composition may further include a ultraviolet (UV) absorbent. The UV absorbent may be used to form the pressure-sensitive adhesive, of which the elastic modulus varies along the thickness direction.

As the UV absorbent, any one that does not inhibit the optical properties, elastic modulus, reworkability, workability or peel strength of the pressure-sensitive adhesive may be used without limitation. For example, the UV absorbent may be, but is not limited to, a benzotriazole compound such as a 2-(2'-hydroxyphenyl)-benzotriazole-based compound such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2-hydroxy-5-(1,1,3,3-tetramethylbutyl)phenyl)benzotriazole, 2-(3',5'-di-tert-butyl-2'-hydroxyphenyl)-5-benzotriazole, 2-(3'-tert-butyl-2'-hydroxyphenyl-5'-methylphenyl)-5-benzotriazole, 2-(3'-sec-butyl-5'-tert-butyl-2'-hydroxyphenyl)benzotriazole, 2-(2'-hydroxy-4'-octyloxyphenylphenyl)-5-benzotriazole or 2-(3',5'-di-tert-butyl-2'-hydroxyphenyl)benzotriazole; a benzophenone compound such as a 2-hydroxy benzophenone-based compound having a 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy functional group; or a benzoic acid ester compound such as a compound having a substituted benzoic acid ester structure such as 4-tert-butyl-phenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl-3,5'-di-tert-butyl-4-hydroxybenzoate, hexadecyl 3,5-di-tert-butyl-4-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate.

In the pressure-sensitive adhesive composition, the UV absorbent may be included in an amount of 10 parts by weight relative to 100 parts by weight of the acrylic polymer, or 0.1 to 10 parts by weight of 100 parts by weight of the active energy beam-polymerizable compound, but the present invention is not limited thereto. The ratio of the UV absorbent may be changed in consideration of a curing condition or desired characteristics such as an elastic modulus or peel strength. However, as the content of the UV absorbent excessively increases, UV absorption of the coating solution excessively increases, and thus it may be difficult to realize the pressure-sensitive adhesive, of which the elastic modulus varies according to the thickness direction. Accordingly, the content of the UV absorbent may be properly selected in consideration thereof.

The pressure-sensitive adhesive composition may further include a radical initiator capable of inducing the polymerization reaction of the active energy beam-poylmerizable compound. The radical initiator may be a photoinitiator or a thermal initiator. A specific kind of the photoinitiator may be suitably selected in consideration of a curing rate and yellowing probability. For example, the photoinitiator may be a benzoin-based, hydroxyl ketone-based, amino ketone-based or phosphine oxide-based photoinitiator. In detail, the photoinitiator may be benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] or 2,4,6-trimethylbenzoyl-diphenyl-phosphineoxide.

The pressure-sensitive adhesive composition may include a radical initiator in an amount of 0.2 to 20, 0.2 to 10 or 0.2 to 5 parts by weight relative to 100 parts by weight of the acrylic polymer. The radical initiator may be included in an amount of 0.2 to 20 parts by weight relative to 100 parts by weight of the active energy beam-polymerizable compound. Accordingly, the reaction of the active energy beam-polymerizable compound may be effectively induced, and degradation in physical properties of the pressure-sensitive adhesive due to remaining components after curing may be prevented.

The pressure-sensitive adhesive composition may further include a silane coupling agent. The silane coupling agent serves to enhance cohesion and adhesion stability of the pressure-sensitive adhesive, thereby improving thermal resistance and humidity resistance, and also enhance adhesion reliability even when left for a long time under severe conditions. For example, the silane coupling agent may be γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, or acetoxyacetotrimethoxy silane, which may be used alone or in combination of at least two thereof. In the present invention, a silane-based coupling agent having an acetoacetate or β-cyanoacetyl group is preferably used, but the present invention is not limited thereto. In the pressure-sensitive adhesive composition, the silane coupling agent may be included in an amount of 0.01 to 5 parts by weight, or 0.01 to 1 parts by weight relative to 100 parts by weight of the acrylic polymer.

The pressure-sensitive adhesive composition may further include a tackifier. For example, the tackifier may be a hydrocarbon-based resin or a hydrogenated product thereof, a rosin resin or a hydrogenated product thereof, a rosin ester resin or a hydrogenated product thereof, a terphene resin or a hydrogenated product thereof, a terphene phenol resin or a hydrogenated product thereof, a polymerized rosin resin and a polymerized rosin ester resin, which may be used alone or in combination of at least two thereof. The tackifier may be included in the composition in an amount of 1 to 100 parts by weight relative to 100 parts by weight of the acrylic polymer.

The pressure-sensitive adhesive composition may further include at least one additive selected from the group consisting of an epoxy resin, a curing agent, a UV stabilizer, an antioxidant, a coloring agent, a reinforcing agent, filler, an antifoaming agent, a surfactant and a plasticizer when necessary.

For example, the pressure-sensitive adhesive may be formed by curing the pressure-sensitive adhesive composition. The pressure-sensitive adhesive may be in the shape of the film or sheet, and may be a single-layered pressure-sensitive adhesive.

The single-layered pressure-sensitive adhesive may have the gradient of the elastic modulus along the thickness direction. Referring to FIG. 1, the pressure-sensitive adhesive 101 may have the elastic modulus varying according to the thickness direction from the first surface 1011 to the second surface 1012.

The pressure-sensitive adhesive may be formed, for example, by a method, in which curing degrees of the PSA are controlled so as to be different according to the thickness direction. For example, when a coating thickness of the pressure-sensitive adhesive composition and the intensity of radiated UV rays are suitably controlled during curing the pressure-sensitive adhesive composition by radiating active energy beams, for example, UV rays, the pressure-sensitive adhesive in which the elastic modulus varies according to the thickness direction may be formed. For example, the UV rays radiated by the above-described method are transmitted along the thickness direction through the layer of the pressure-sensitive adhesive composition, and become extinct due to a reaction with a radical initiator and/or the absorption by the UV absorbent. When the degree of extinction is suitably adjusted, the intensity of UV rays inducing the curing reaction becomes weak from a side of the layer of the pressure-sensitive adhesive composition to which the UV rays are radiated downwards according to the thickness direction of the layer, and thus the curing degree may be differently controlled according to the thickness direction.

For example, the pressure-sensitive adhesive may be prepared by a method of coating the pressure-sensitive adhesive composition and irradiating it with UV rays from one surface of the coating layer. Here, the irradiated UV rays are transmitted according to the thickness direction of the coating layer and absorbed by the coating layer, thereby forming the gradient of the elastic modulus according to the thickness direction of the cured pressure-sensitive adhesive.

When components and thickness of the pressure-sensitive adhesive composition and/or the intensity of UV rays are controlled in the above operation, the UV rays may be absorbed along the thickness direction of the coating layer, thereby forming the gradient of the elastic modulus.

FIG. 2 shows a schematic of one illustrative embodiment of the process forming the pressure-sensitive adhesive, in which the PSA is formed by irradiating the layer 201 of the PSA composition with the active energy beams such as UV rays. The irradiation of UV rays may be performed from one side of the layer 201 of the pressure-sensitive adhesive composition formed between two releasing films 202A and 202B. The UV rays are absorbed in the process of progressing along the thickness direction of the layer 201. Therefore, a surface 201a on which the UV rays are directly incident and regions adjacent thereto may have a higher elastic modulus and a lower peel strength since the layer 201 is sufficiently cured, but the opposite surface 201b and regions adjacent thereto may have a lower elastic modulus and a higher peel strength since the layer 201 is relatively less cured.

The radiation of active energy beams such as UV rays may be performed using a known means such as a high pressure mercury lamp, an electrodeless lamp or a xenon lamp. In addition, conditions for radiating active energy beams are not particularly limited, and may be suitably selected in consideration of the composition of the pressure-sensitive adhesive composition. Accordingly, a cured product in which an elastic modulus varies in a thickness direction may be effectively prepared. For example, the UV rays may have a illumination of approximately 50 to 2,000 mW/cm$^2$, and a luminous energy of approximately 10 to 1,000 mJ/cm$^2$, but the present invention is not limited thereto.

In the operation of forming the pressure-sensitive adhesive, for curing efficiency or the formation of the IPN structure, before, after or during the radiation of active energy beams, a process such as heating, drying or aging may be performed.

The pressure-sensitive adhesive may have a gel content represented by General Formula 1 of 80 weight % or more or 90 weight % or more.

Gel content(unit:weight %)=$B/A \times 100$ [General Formula 1]

In General Formula 1, A is a weight of the pressure-sensitive adhesive, and B is a dry weight of an unsolved pressure-sensitive adhesive obtained after 48-hour precipitation of the pressure-sensitive adhesive having the weight A in ethyl acetate at room temperature.

When the gel content is 80 weight % or more, excellent durability may be realized under severe conditions. The upper limit of the gel content may be, but is not limited to, approximately 99% or less.

The pressure-sensitive adhesive may have a thickness of 0.001 to 100 μm. The thickness of the pressure-sensitive adhesive may be, but is not limited to, 0.1, 1, 5, 10, 20 or 25 μm or more, or 80, 60, 40, 30 or 10 μm or less in the above range.

In this application, a polarizing plate is also provided. The illustrative polarizing plate may include a polarizer and a pressure-sensitive adhesive. The pressure-sensitive adhesive may be the pressure-sensitive adhesive described above. The terms "polarizer" and "polarizing plate" may be used with different meanings. For example, the polarizer may refer to a layer, film or sheet itself having a polarizing function, and the polarizing plate may refer to an optical element including a different functional layer, film or sheet along with the polarizer. Here, as the additional functional layer, film or sheet, a polarizer protective film, an optical compensation film, an adhesive layer or a pressure-sensitive adhesive may be used.

As a polarizer, a known polarizer may be used without particular limitation. The polarizer may be a polyvinylalcohol (PVA)-based absorption-type linear polarizer.

In the polarizing plate, the polarizer and the pressure-sensitive adhesive may be sequentially disposed. For example, the pressure-sensitive adhesive may be attached to one surface of the polarizer. The pressure-sensitive adhesive may be directly attached to one surface of the polarizer, or have another element between the polarizer and the pressure-sensitive adhesive in the polarizing plate. In this document, the term "B is directly attached to A" may refer to a state where no other elements are disposed between A and B. Here, another element between the polarizer and the pressure-sensitive adhesive may be an optical compensation film, a polarizer protective film or an adhesive. One illustrative polarizing plate may include an adhesive layer directly attached to the polarizer and a pressure-sensitive adhesive directly attached to the adhesive layer.

In one embodiment, an adhesive layer may be further included between the polarizer and the pressure-sensitive adhesive. FIG. 3 shows the above-described structure including the polarizer 301, the adhesive layer 302 and the pressure-sensitive adhesive 101. When the adhesive layer is used, as the adhesive layer, a conventional adhesive may be used without particular limitation. For example, an adhesive layer used to attach a polarizer to a protective film in a structure of the conventional polarizing plate may be used.

For example, the adhesive layer may be a polyvinylalcohol-based adhesive; an acryl-based adhesive; a vinyl acetate-based adhesive; a urethane-based adhesive; a polyester-based adhesive; a polyolefin-based adhesive; a polyvinylalkylether-based adhesive; a rubber-based adhesive; a chlorovinyl-vinylacetate-based adhesive; a styrene-butadiene-styrene (SBS) adhesive; a hydrogenated styrene-butadiene-styrene (SEBS)-based adhesive; an ethylene-based adhesive; or an acrylic acid ester-based adhesive, which are used alone or in combination of at least two thereof. Such an adhesive may be formed using, for example, a water-based, solvent-based or non-solvent-based adhesive composition. In addition, the adhesive composition may be a heat-, room temperature-, moisture-, active energy beam- or hybrid-curable adhesive composition.

A method of forming the adhesive layer on the polarizer is not particularly limited, and for example, a method of coating the adhesive composition on the polarizer, laminating a pressure-sensitive adhesive again, and curing the coated adhesive composition or a liquid drop method may be used.

A thickness of the adhesive layer may be set to a conventional thickness in consideration of physical properties without particular limitation.

In one embodiment, the pressure-sensitive adhesive may be included in the polarizing plate to attach a first surface, that is, a surface having lower peel strength than a second surface, to the adhesive layer. In such a case, the second surface may be a pressure-sensitive adhesive surface for attaching the polarizing plate to a liquid crystal panel.

In the polarizing plate, a protective film may be attached to one or both surfaces of the polarizer. For example, when the pressure-sensitive adhesive is attached to the polarizer with the above-mentioned adhesive layer, the protective film may be attached only to a surface of the polarizer opposite to the surface to which the adhesive layer is attached. In such a case, in the polarizing plate, the protective film may be attached only to a surface of the polarizer, and the pressure-sensitive adhesive may be attached to the surface of the polarizer to which the protective film is not attached as an adhesive layer. The protective film may be attached to the polarizer, for example, with a known pressure-sensitive adhesive or adhesive.

As the protective film, a cellulose-based film such as a TAC film; a polyester-based film such as a poly(ethylene terephthalate) film (PET film); a polycarbonate-based film; a polyethersulfone-based film; and a polyolefin-based film such as an acryl-based film and/or polyethylene film, a polypropylene film, a cyclic polyolefin film, a polyolefin film having a norbornene structure or an ethylene-propylene copolymer film may be used, but the present invention is not limited thereto.

The polarizing plate may further include a releasing film attached to the pressure-sensitive adhesive. The releasing film may employ conventional components known in the art. The polarizing plate may further include at least one functional layer selected from the group consisting of an anti-reflection layer, an anti-glare layer, a phase retardation plate, a wide viewing angle compensation film and a luminance enhancing film when necessary.

In this application, a display device is also provided. The illustrative display device may be an LCD device, which includes a liquid crystal panel and the polarizing plate attached to one or both surfaces of the liquid crystal panel. Here, the polarizing plate may be attached to the liquid crystal panel by the pressure-sensitive adhesive.

A kind of the liquid crystal panel is not particularly limited. For example, all kinds of known panels including, but not limited to, a passive matrix panel such as a twisted nematic (TN), super twisted nematic (STN), ferroelectric (F) or polymer dispersed (PD) panel; an active matrix panel such as a two-terminal or three-terminal panel; an in-plane switching (IPS) panel; or a vertical alignment (VA) panel may be used.

Kinds of other components included in the LCD device, for example, a color filter substrate and an array substrate, are not particularly limited either, and any components known in the art may be employed without limitation.

EFFECT

The pressure-sensitive adhesive of the present application can be used to provide a polarizing plate which has a tensile modulus that varies in a thickness direction, and for example, which has a smaller thickness and a lighter weight, and also satisfies all of the physical properties required for the polarizing plate such as durability, water resistance, workability and light leakage preventability, and a liquid crystal display device including the same.

DETAILED DESCRIPTION OF EXEMPLARY EMBODIMENTS

Figure 1:
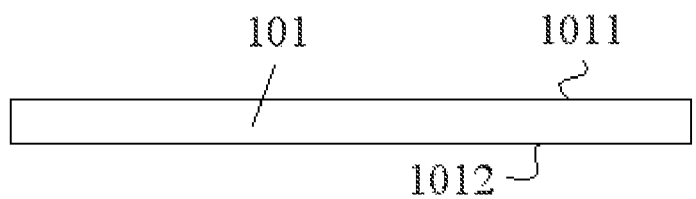
FIG. 1 shows a schematic of one illustrative embodiment of the polarizing plate.

Hereinafter, the present application will be described with reference to Examples according to the present application and Comparative Examples not according to the present application in detail. However, the present application is not limited to the following Examples.

Preparation Example 1. Preparation of Acryl Polymer (A)

79 parts by weight of n-butyl acrylate (n-BA), 20 parts by weight of methoxy ethyleneglycol acrylate (MEA) and 1.0 part by weight of hydroxyethyl acrylate (HEA) were put into a 1 L reactor refluxing nitrogen gas and equipped with a cooling device to facilitate temperature control. Subsequently, 120 parts by weight of ethyl acetate (EAc) was put as a solvent into the reactor, which was purged with the nitrogen gas for 60 minutes to remove oxygen. Afterward, the temperature was maintained at 60° C., 0.03 parts by weight of azobisisobutyronitrile (AIBN) was put into the reactor as a reaction initiator, and the reaction was carried out for 8 hours. After the reaction, the reaction product was diluted with ethyl acetate (EAc), and thus an acrylic polymer (A) having a solid content concentration of 15 weight %, a weight average molecular weight of 1,800,000, and a molecular weight distribution of 4.5 was prepared.

Preparation Examples 2 to 8. Preparation of Acryl Polymers (B) to (H)

Acryl polymers were prepared by the method as described in Preparation Example 1, except that monomer compositions were changed as shown in Table 1 (in Table 1, the acrylic polymer (A) is the same as the polymer prepared in Preparation Example 1).

TABLE 1

| | Copolymer | | | | |
|---|---|---|---|---|---|
| | A | B | C | D | E |
| n-BA | 79 | 94 | 79 | 79 | 98.7 |
| MEA | 20 | — | — | — | — |
| EEA | — | 15 | 30 | — | — |
| PEA | — | — | — | 25 | — |
| 2-HEA | 1 | 1 | 1 | 1 | 1 |
| AA | — | 0.5 | — | — | 0.3 |
| $M_w$ (in tens of thousands) | 180 | 175 | 165 | 150 | 175 |
| PDI | 4.5 | 5.2 | 5.1 | 4.7 | 3.8 |

Content Unit: parts by weight
n-BA: n-butyl acrylate
MEA: methoxy ethyleneglycol acrylate
EEA: ethoxy diethyleneglycol acrylate
PEA: phenoxy ethyleneglycol acrylate
2-HEA: 2-hydroxyethyl acrylate
AA: acrylic acid
Mw: weight average molecular weight
PDI: molecular weight distribution Example 1

Formation of Pressure-Sensitive Adhesive Layer

A pressure-sensitive adhesive composition was prepared by blending 100 parts by weight of the acrylic polymer (A), 3 parts by weight of a multifunctional crosslinking agent (TDI-based isocyanate, Coronate L, Nippon Polyurethane Industry (Japan)), 100 parts by weight of a multifunctional acrylate (trifunctional urethane acrylate, Aronix M-315, To a Gosei K.K.), 2 parts by weight of hydroxycyclohexylphenylketone as a photoinitiator (Irgacure 184, Ciba Specialty Chemicals (Switzerland)), 2 parts by weight of a triazine-based UV absorbent (Tinuvin 400, Ciba Specialty Chemicals (Switzerland)) and 0.2 parts by weight of a silane coupling agent having a β-cyanoacetyl group (M812, LG Chem (Korea)) in a solvent to have a solid concentration of 30 weight %. Subsequently, the prepared pressure-sensitive adhesive composition was coated on a releasing-treated surface of a PET film (thickness: 38 μm, MRF-38, Mitsubishi) subjected to releasing treatment to have a dry thickness of 25 μm, and the resulting film was dried in an oven at 110° C. for 3 minutes. Then, a releasing-treated surface of another releasing-treated PET film (thickness: 38 μm, MRF-38, Mitsubishi) was further laminated on the dried coating layer, thereby forming a stacked structure having a structure shown in FIG. 2, and UV rays (illumination: 250 mW/cm², luminous energy: 300 mJ/cm²) were irradiated using a high pressure mercury lamp, thereby forming a pressure-sensitive adhesive layer (a cured layer of the layer 201 of the pressure-sensitive adhesive composition) between two of the released PET films 202A and 202B. Hereinafter, for the convenience of description, a surface of the pressure-sensitive adhesive layer on which the UV rays were incident is referred to a first surface 201a, and the opposite surface is referred to a second surface 201b.

Formation of Polarizing Plate

A polarizer was formed by extending a polyvinylalcohol-based resin film, dying the film with iodine and treating the film with a boric acid aqueous solution. Subsequently, a 60 μm-thick triacetyl cellulose (TAC) film was attached to one surface of the polarizer using a water-based polyvinylalcohol-based adhesive conventionally used to attach a protective film to a polarizer. Afterward, the first surface of the previously formed pressure-sensitive adhesive layer was laminated using the same water-based polyvinylalcohol-based adhesive as that used previously on a surface of the polyvinylalcohol-based polarizer to which the TAC film was not attached, thereby forming a polarizing plate.

Examples 2 to 7 and Comparative Examples 1 and 2

Preparation of Pressure-Sensitive Adhesive Composition

A pressure-sensitive adhesive composition was prepared by the same method described in Example 1, except that compositions were changed as shown in Tables 2 and 3, and a polarizing plate was formed by the same method as described in Example 1, except that the radiated luminous energy and illumination of UV rays were suitably changed in consideration of desired characteristics such as an elastic modulus and peel strength.

TABLE 2

| | Example | | | | | | | | |
|---|---|---|---|---|---|---|---|---|---|
| | 1 | 2 | 3 | 4 | 5 | 6 | 7 | 8 | 9 |
| Polymer(A) | 100 | — | — | — | 100 | 100 | 100 | — | 100 |
| Polymer(B) | — | 100 | — | — | — | — | — | 100 | — |
| Polymer(C) | — | — | 100 | — | — | — | — | — | — |
| Polymer(D) | — | — | — | 100 | — | — | — | — | — |
| MFA1 | 100 | 100 | 100 | 100 | — | 20 | — | 100 | — |
| MFA2 | — | — | — | — | 80 | 80 | 80 | — | 80 |
| Crosslinking Agent | 3.0 | 3.0 | 3.0 | 3.0 | 3.0 | 3.0 | 3.0 | 3.0 | 3.0 |

TABLE 2-continued

|  | Example | | | | | | | | |
|---|---|---|---|---|---|---|---|---|---|
|  | 1 | 2 | 3 | 4 | 5 | 6 | 7 | 8 | 9 |
| Irg184 | 2.0 | 2.0 | 2.0 | 2.0 | 3.0 | 3.0 | 3.0 | 2.0 | 3.0 |
| UVA | 2.0 | 2.0 | 2.0 | 2.0 | 2.0 | 3.0 | 3.0 | 2.0 | 2.0 |
| M812 | 0.2 | 0.2 | 0.2 | 0.2 | 0.2 | 0.2 | 0.2 | 0.2 | 0.2 |
| T-789J | — | 0.4 | — | — | — | — | — | 0.4 | — |

Content Unit: Parts by Weight
MFA1: Trifunctional urethane acrylate (Aronix M-315, Toa Gosei K.K)
MFA2: Hexafunctional urethane acrylate (UA 306I, Kyoeisha)
Crosslinking Agent: TDI-based isocyanate Crosslinking Agent (Coronate L, Nippon Polyurethane Industry)
Irgacure 184: Hydroxy cyclohexylphenyl ketone (Ciba Specialty Chemicals, Switzerland)
UV Absorbent: Triazine-based UV Absorbent (Tinuvin 400, Ciba Specialty Chemicals, Switzerland)
M812: a silane coupling agent having a β-cyanoacetyl group (LG Chem (Korea))
T-789J: Silane Coupling Agent containing acetoacetate group (Soken Co. (Japan)))

TABLE 3

|  | Comparative Example | |
|---|---|---|
|  | 2 | 5 |
| Polymer(A) | — | 100 |
| Polymer(E) | 100 | — |
| MFA1 | 20 | — |
| MFA2 | 80 | — |
| Crosslinking Agent | 3.0 | 3.0 |
| Irg184 | 2.0 | — |
| UVA | 2.0 | 2.0 |
| T-789J | 0.2- | 0.2- |

Content Unit:
Parts by Weight
MFA1: Trifunctional urethane acrylate (Aronix M-315, Toa Gosei K.K)
MFA2: Hexafunctional urethane acrylate (UA 306I, Kyoeisha)
Crosslinking Agent: TDI-based isocyanate Crosslinking Agent (Coronate L, Nippon Polyurethane Industry)
Irgacure 184: Hydroxy cyclohexylphenyl ketone (Ciba Specialty Chemicals, Switzerland)
UV Absorbent: Triazine-based UV Absorbent (Tinuvin 400, Ciba Specialty Chemicals, Switzerland)
T-789J: Silane Coupling Agent containing acetoacetate group (Soken Co. (Japan))

<Evaluation of Physical Properties>
1. Evaluation of Tensile Modulus

In this document, a tensile modulus of a pressure-sensitive adhesive layer was measured by a stress-strain test due to tension according to a method defined in ASTM D638, or when it was difficult to directly measure a tensile modulus, a storage modulus was measured and then converted into the tensile modulus by the following Conversion Formula. In detail, a stacked structure having a structure of FIG. 2 (a stacked structure of a released PET film 202A, a cured product of a layer 201 of a pressure-sensitive adhesive composition and a released PET film 202B) as prepared in Examples and Comparative Examples was cut into a dog bone-type specimen in a size of 7 cm (length)×1 cm (width), both ends of the specimen were fixed with jigs for a tensile test, and a tensile modulus was measured. The conditions for measuring the tensile modulus were as follows.

<Conditions for Measuring Tensile Modulus>
Measuring Apparatus: Universal Test Machine (UTM)
Equipment Model: Zwick Roell Z010, Instron
Measurement Conditions:
Load Cell: 500 N
Tensile Rate: 3 mm/sec <Measurement of Storage Modulus and Conversion into Tensile Modulus>
A pressure-sensitive adhesive layer was cut in a size of 15 cm×25 cm×25 μm (width×length×thickness), and then the cut pressure-sensitive adhesive layers were stacked in five layers. Subsequently, the stacked adhesive layers were cut into circles having diameters of 8 mm, and pressed using glasses overnight to enhance wettability at an interface between the layers, thereby removing air bubbles generated during stacking. As a result, a specimen was prepared. Subsequently, the specimen was placed on a parallel plate, and a gap was adjusted. Then, after Normal & Torque was adjusted to zero, and the stabilization of normal force was checked, the storage modulus was measured under the following conditions, and a tensile modulus was calculated according to the following Conversion Formula.

Measurement Apparatus and Measuring Conditions
Measurement Apparatus: ARES-RDA, TA Instruments Inc. with forced convection oven
Measuring Conditions:
Geometry: 8 mm parallel plate
Gap: around 1 mm
Test Type: dynamic strain frequency sweep
Strain=10.0[%], temperature: 30° C.
Initial Frequency: 0.4 rad/s, final frequency: 100 rad/s $$E=3G \qquad \text{<Conversion Formula>}$$

In the above Formula, E is a tensile modulus, and G is a storage modulus.

2. Evaluation of Peel Strength and Reworkability

A polarizing plate was formed by the method as described in Example 1 using each of the pressure-sensitive adhesive layers formed in Examples or Comparative Examples, except that a direction of the pressure-sensitive adhesive layer was changed along a surface of the pressure-sensitive adhesive layer whose peel strength was to be measured. That is, when the peel strength of a first surface was measured in the formation of the polarizing plate disclosed in Example 1, a second surface was attached to the side of the polarizer, and when the peel strength of the second surface was measured, the first surface was attached to the side of the polarizer, thereby forming a polarizing plate. Afterward, a specimen was formed by cutting the polarizing plate in a size of 25 mm×100 mm (width×length). Subsequently, a released PET film attached to the pressure-sensitive adhesive layer was peeled off, and the surface of the pressure-sensitive adhesive layer was attached to alkali-free glass using a 2 kg roller according to the specification of JIS Z 0237. Subsequently, the alkali-free glass to which the pressure-sensitive adhesive layer was attached was compressed in an autoclave (50° C., 0.5 atm) for approximately 20 minutes, and stored under constant temperature and humidity conditions (23° C., relative humidity: 50%) for 25 hours. Then, using a texture analyzer (TA) (Stable Micro System (United Kingdom)), the polarizing plate was peeled off of the alkali-free glass at a peel rate of 300 mm/min and a peel angle of 180 degrees to measure a peel strength. In addition, reattachment was evaluated under the following criteria:

<Criteria for Evaluation of Reattachment>
- ○: A day after attachment, the peel strength was 800 N/25 mm or less.
- Δ: A day after attachment, the peel strength was 1,000 N/25 mm or more.
- x: A day after attachment, the peel strength was 2,000 N/25 mm or more.

3. Evaluation of Durability 2 specimens were prepared by cutting a specimen prepared by cutting a polarizing plate in a size of 90 mm×170 mm (width×length) per Example or Comparative Example. Subsequently, the two specimens were attached to both surfaces of a glass substrate (110 mm×190 mm×0.7 mm=width×length×thickness) such that optical absorption axes were crossed, thereby preparing a sample. A pressure applied during attachment was approximately 5 kg/cm², and the attachment was carried out in a clean room to avoid air bubbles or extraneous materials at an interface. Afterward, the humidity and thermal resistance of the sample was determined by observing whether air bubbles or peeling were generated at a pressure-sensitive adhesive interface after the sample was left for 1,000 hours under conditions including a temperature of 60° C. and a relative humidity of 90%, and the thermal resistance was determined by observing whether air bubbles or peeling were generated at a pressure-sensitive adhesive interface after the sample was left for 1,000 hours at a temperature of 80° C. The formed samples were left at room temperature for 24 hours, followed by the evaluation of the humidity and thermal resistance or thermal resistance. Evaluation conditions were as follows:

<Criteria for Evaluation of Durability>
- ○: No air bubbles and/or peeling were generated.
- Δ: Air bubbles and/or peeling were generated somewhat.
- x: Air bubbles and/or peeling were generated considerably.

4. Evaluation of Water Resistance

Samples were prepared by attaching specimens formed by cutting the polarizing plates formed in Examples and Comparative Examples to a size of 90 mm×170 mm (width× length) to one surface of a glass substrate (110 mm×190 mm×0.7 mm=width×length×thickness). A pressure applied during attachment was approximately 5 kg/cm², and the attachment was executed in a clean room to prevent bubbles or extraneous materials at an interface. Subsequently, the formed sample was put into water at 60° C., left for 24 hours, and it was observed whether bubbles or peeling were generated. The water resistance was evaluated according to the following criteria.

<Criteria for Evaluation of Water Resistance>
- ○: No air bubbles and/or peeling were generated.
- Δ: Some bubbles and/or peeling were generated at an interface.
- x: Bubbles and/or peeling were generated considerably.

5. Evaluation of Haze

Figure 2:
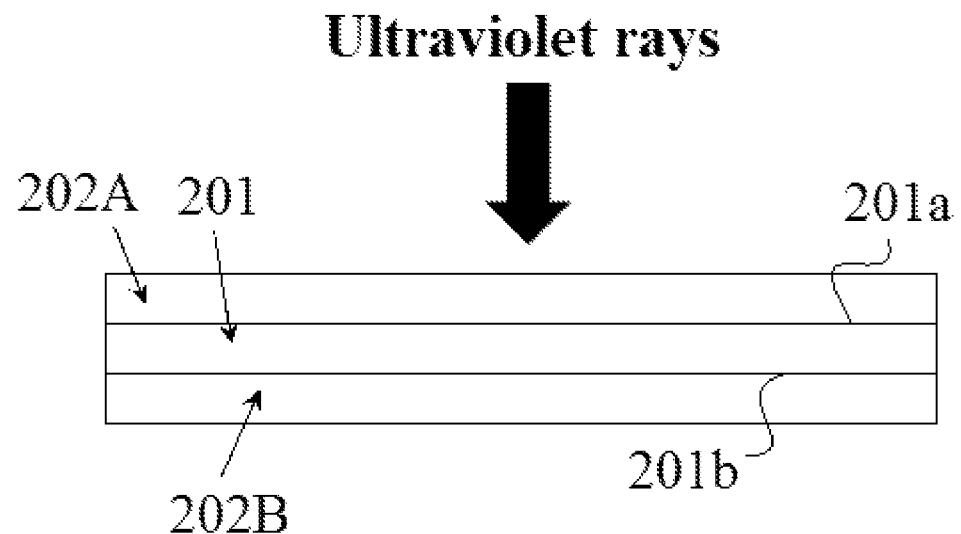
FIG. 2 shows a schematic of one illustrative embodiment of the process forming the pressure-sensitive adhesive.
Figure 3:
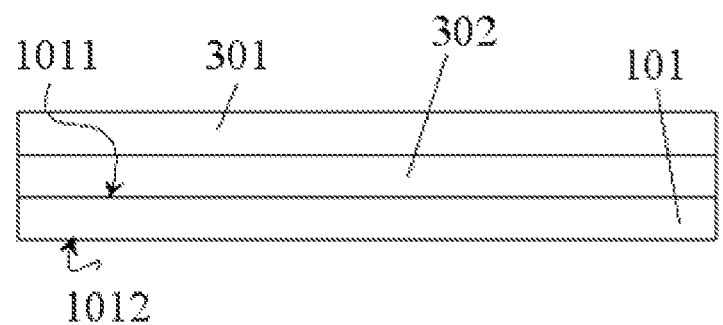
FIG. 3 shows a schematic of one illustrative embodiment of a cross-sectional view of the polarizing plate.

A sample (thickness of pressure-sensitive adhesive layer: 23 μm) having the structure of FIG. 2 was prepared using a pressure-sensitive adhesive composition in Example or Comparative Example, and a haze of the pressure-sensitive adhesive layer in the sample was measured using a haze meter (HR-100, Murakami Color Research Laboratory, Japan) according to the specification of JIS K 7105-1.

6. Evaluation of Uniformity of Light Transmission

The polarizing plates formed in Examples and Comparative Examples were attached to both surfaces of a 22-inch LCD monitor (LG Philips LCD) in a state in which optical axes crossed, stored under constant temperature and humidity conditions (23° C., relative humidity: 50%) for 24 hours, and left at 80° C. for 200 hours. Subsequently, light was radiated to the monitor using a back light in a dark room, and the uniformity of light transmission was evaluated according to the following criteria:

<Criteria for Evaluation of Uniformity of Light Transmission>
- ⊚: non-uniformity of light transmission was not observed in four peripheral regions of a monitor with the naked eye
- ○: non-uniformity of light transmission was observed slightly in four peripheral regions of a monitor with the naked eye
- Δ: non-uniformity of light transmission was observed somewhat in four peripheral regions of a monitor with the naked eye
- x: non-uniformity of light transmission was observed considerably in four peripheral regions of a monitor with the naked eye 7. Evaluation of Weight Average Molecular Weight and Distribution of Molecular Weight The weight average molecular weight and the distribution of a molecular weight of an acrylic polymer were measured using GPC under the following conditions. To plot a calibration curve, measurement results were converted using standard polystyrene of an Agilent system.

<Conditions for Measuring Weight Average Molecular Weight>

Measuring Apparatus: Agilent GPC (Agilent 1200 series, USA)
Column: Two connected PL mixed B
Column Temperature: 40° C.
Eluent: Tetrahydrofuran
Flow Rate: 1.0 mL/min
Concentration: ~2 mg/mL (100 μL injection)

The measurement results are summarized and listed in Tables 4 and 5.

TABLE 4

|  | Example | | | | | | | | |
| --- | --- | --- | --- | --- | --- | --- | --- | --- | --- |
|  | 1 | 2 | 3 | 4 | 5 | 6 | 7 | 8 | 9 |
| Tensile Modulus (Room Temperature, MPa) | 95 | 65 | 130 | 175 | 207 | 250 | 215 | 65 | 207 |
| Peel Strength on First Surface (gf/25 mm) | 25 | 35 | 20 | 18 | 14 | 15 | 25 | 35 | 14 |
| Peel Strength on Second Surface (gf/25 mm) | 500 | 650 | 400 | 350 | 335 | 265 | 520 | 660 | 350 |
| reworkability | ○ | ○ | ○ | ○ | ○ | ○ | ○ | ○ | ○ |
| Thermal Resistance | ○ | ○ | ○ | ○ | ○ | ○ | ○ | ○ | ○ |

TABLE 4-continued

|  | Example | | | | | | | | |
|---|---|---|---|---|---|---|---|---|---|
|  | 1 | 2 | 3 | 4 | 5 | 6 | 7 | 8 | 9 |
| Humidity and Thermal Resistance | ○ | ○ | ○ | ○ | ○ | ○ | ○ | ○ | ○ |
| Water Resistance | ○ | ○ | ○ | ○ | ○ | ○ | ○ | ○ | ○ |
| Haze (%) | 7.2 | 8.4 | 6.5 | 6.8 | 5.2 | 5.3 | 5.9 | 8.4 | 5.2 |
| Uniformity of Light Transmission | ⊙ | ○ | ⊙ | ⊙ | ○ | ⊙ | ○ | ○ | ○ |

TABLE 5

|  | Comparative Example | |
|---|---|---|
|  | 1 | 2 |
| Tensile Modulus (Room Temperature, MPa) | 9 | 0.04 |
| Peel Strength on First Surface (gf/25 mm) | 120 | 500 |
| Peel Strength on Second Surface (gf/25 mm) | 850 | 850 |
| reworkability | Δ | Δ |
| Thermal Resistance | x | x |
| Humidity and Thermal Resistance | Δ | x |
| Water Resistance | x | x |
| Haze (%) | 15.0 | 6.4 |
| Uniformity of Light Transmission | x | ○ |

What is claimed is:

1. A pressure-sensitive adhesive for a polarizing plate, which is in a shape of a single-layered film having a first surface which is a pressure-sensitive adhesive surface for attaching one surface of a polarizer and a second surface which is a pressure-sensitive adhesive surface for attaching a liquid crystal panel, of which an elastic modulus varies along a thickness direction, of which an average tensile modulus at any room temperature, which is between 10° C. to 40° C., is in the range from 0.065 GPa to 0.25 GPa,
wherein a peel strength of the second surface with respect to glass (P2) is in the range from 265 to 660 gf/25 mm, and a peel strength of the first surface with respect to glass (P1) is in the range from 14 to 100 gf/25 mm, at the room temperature,
wherein a difference (P2−P1) between the peel strength of the second surface with respect to glass (P2) and the peel strength of the first surface with respect to glass (P1) is 250 to 625 gf/25 mm, and
wherein the pressure-sensitive adhesive is a UV cured product of a pressure-sensitive adhesive composition comprising an acrylic polymer comprising polymerized units derived from alkyl (meth)acrylate, a compound of Formula 1 and a crosslinkable comonomer; and a multifunctional crosslinking agent:

[Formula 1]

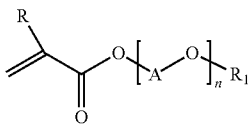

where R is hydrogen or an alkyl group, A is an alkylene group or an alkylidene group, $R_1$ is an alkyl group or an aryl group, and n is a number between 1 and 50.

2. The pressure-sensitive adhesive according to claim 1, wherein a ratio (P2/P1) of the peel strength of the second surface with respect to glass (P2) and the peel strength of the first surface with respect to glass (P1) is 5 or more.

3. The pressure-sensitive adhesive according to claim 1, wherein a value (MP2) obtained by multiplying the average tensile modulus (M) at the room temperature and the peel strength of the second surface with respect to glass (P2) at the room temperature is 20 or more,
wherein the units of M are GPa, the units of P2 are gf/25 mm and the units of MP2 are GPa·gf/25 mm.

4. The pressure-sensitive adhesive according to claim 1, wherein the pressure-sensitive adhesive composition further comprises an active energy beam-polymerizable compound and a radical initiator.

5. The pressure-sensitive adhesive according to claim 1, wherein the pressure-sensitive adhesive composition further comprises an ultraviolet ray absorbent.

6. A polarizing plate, comprising:
a polarizer; and
the pressure-sensitive adhesive of claim 1 disposed on a first surface of the polarizer.

7. The polarizing plate according to claim 6, further comprising an adhesive layer between the polarizer and the pressure-sensitive adhesive.

8. The polarizing plate according to claim 7, wherein the adhesive layer is directly attached to the polarizer; and the pressure-sensitive adhesive is directly attached to the adhesive layer.

9. The polarizing plate according to claim 6, further comprising a protective film on a surface of the polarizer opposite to the surface on which the pressure-sensitive adhesive is disposed.

10. A liquid crystal display device, comprising a liquid crystal panel, on one or both sides of which the polarizing plate of claim 6 is attached by the pressure-sensitive adhesive.

11. The device according to claim 10, wherein the liquid crystal panel is a passive matrix panel, an active matrix panel, an in plane switching panel or a vertical alignment panel.

* * * * *